United States Patent
Yu et al.

(10) Patent No.: US 9,325,664 B2
(45) Date of Patent: Apr. 26, 2016

(54) METHOD FOR SETTING ADDRESS FOR SERVICE BLADE, PLATFORM APPARATUS, AND SYSTEM

(71) Applicant: HUAWEI TECHNOLOGIES CO., LTD., Shenzhen (CN)

(72) Inventors: Guanglou Yu, Shenzhen (CN); Feng Mo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 248 days.

(21) Appl. No.: 14/085,146

(22) Filed: Nov. 20, 2013

(65) Prior Publication Data
US 2014/0082218 A1 Mar. 20, 2014

Related U.S. Application Data

(63) Continuation of application No. PCT/CN2011/074430, filed on May 20, 2011.

(51) Int. Cl.
*H04L 29/12* (2006.01)
*H04L 12/413* (2006.01)
(Continued)

(52) U.S. Cl.
CPC .......... *H04L 61/2503* (2013.01); *H04L 12/413* (2013.01); *H04L 61/2007* (2013.01); *G06F 3/0661* (2013.01); *H04L 41/12* (2013.01); *H04L 61/6004* (2013.01)

(58) Field of Classification Search
CPC .... H04L 41/12; H04L 41/0213; G06F 3/0661
USPC ......................................... 709/245, 220–223
See application file for complete search history.

(56) References Cited

U.S. PATENT DOCUMENTS

2003/0033393 A1 2/2003 Larson et al.
2004/0260841 A1* 12/2004 Mathew .............. H04L 41/0206
709/250

(Continued)

FOREIGN PATENT DOCUMENTS

CN 1852169 A 10/2006
CN 1960261 A 5/2007

(Continued)

OTHER PUBLICATIONS

International Search Report issued Mar. 1, 2012, in corresponding International Patent Application No. PCT/CN2011/074430.

*Primary Examiner* — Brendan Higa
*Assistant Examiner* — Joseph Maniwang
(74) *Attorney, Agent, or Firm* — Staas & Halsey LLP

(57) ABSTRACT

A method for setting an address for a service blade includes: receiving a first IP address setting command in an Ethernet protocol format; converting the first IP address setting command into a second IP address setting command in a platform management interface protocol format, where the first and second IP address setting commands include a slot ID of a slot into which a service blade is inserted and IP address data corresponding to the slot ID; and sending the second IP address setting command to the service blade corresponding to the slot ID over a platform management interface network. An IP address setting command is sent to the service blade, which implements a function of setting an IP address for the service blade, thereby avoiding a problem of an additionally increased cost because of an external device in use.

11 Claims, 4 Drawing Sheets

(51) Int. Cl.
*H04L 12/24* (2006.01)
*G06F 3/06* (2006.01)

(56) References Cited

U.S. PATENT DOCUMENTS

| | | | |
|---|---|---|---|
| 2005/0125575 A1* | 6/2005 | Alappat | H04L 29/1232 |
| | | | 710/41 |
| 2007/0043833 A1 | 2/2007 | Lu et al. | |
| 2007/0086449 A1 | 4/2007 | Huang et al. | |
| 2009/0157941 A1* | 6/2009 | Bolan | H04L 41/0886 |
| | | | 711/6 |
| 2013/0262642 A1* | 10/2013 | Kutch | H04L 67/125 |
| | | | 709/223 |

FOREIGN PATENT DOCUMENTS

| | | |
|---|---|---|
| CN | 1964282 A | 5/2007 |
| CN | 101499925 A | 8/2009 |
| CN | 102273178 A | 12/2011 |

\* cited by examiner

METHOD FOR SETTING ADDRESS FOR SERVICE BLADE, PLATFORM APPARATUS, AND SYSTEM

CROSS-REFERENCE TO RELATED APPLICATIONS

This application is a continuation of International Application No. PCT/CN2011/074430, filed on May 20, 2011, which is hereby incorporated by reference in its entirety.

TECHNICAL FIELD

Embodiments of the present invention relates to the communications field, and in particular, to a method for setting an address for a service blade, a platform apparatus, and a system.

BACKGROUND

In an architecture system having a private network that is independent of IP technologies, ATCA (Advanced Telecommunications Computing Architecture, Advanced Telecommunications Computing Architecture) is a new generation mainstream industrial computing technology for a Compact-PCI (Compact Peripheral Component Interconnect, Compact Peripheral Component Interconnect) standard that is widely used in fields such as telecommunications, astronautics, industrial control, medical appliances, intelligent traffic, and military equipment, and is highly cost-effective, modularized-structure-based, compatible, and expandable hardware architecture prepared for next-generation unified communications and data network applications. At present, a shelf based on an ATCA platform produced by a mainstream manufacturer includes 12 service blades, two switch blades, and two shelf management blades (SMM, Shelf Management Module). The blades implement a network connection by using a backplane of the shelf.

To manage an IP address of a service blade inside the shelf, a VGA (Video Graphics Array, Video Graphics Array) monitor and a USB (Universal Serial Bus, Universal Serial Bus) keyblade and mouse may be connected externally by using a rear blade of an ATCA service blade; a manual operation may be performed to log in to an OS (Operating System) of the service blade; and then an IP (Internet Protocol, Internet Protocol) address is set in the OS. However, this method requires displaying and input devices to be connected externally, which increases a maintenance cost. In addition, because a manual operation is required, an operation step is complicated, and when there are many blades, overall efficiency is low.

SUMMARY

Embodiments of the present invention provide a method for setting an IP address for a service blade, a platform apparatus, and a system, which is capable of solving the problem of low efficiency in IP management.

In one aspect, a method for setting an IP address for a service blade is provided, including: receiving a first IP address setting command in an Ethernet protocol format; converting the first IP address setting command into a second IP address setting command in a platform management interface protocol format, where the first IP address setting command and the second IP address setting command include a slot ID (identifier) of a slot into which a service blade is inserted and IP address data corresponding to the slot ID; and sending the second IP address setting command to the service blade corresponding to the slot ID over a platform management interface network, so that the service blade sets an IP address for one or more network adapter modules on the service blade according to the IP address data included in the IP address setting command.

In another aspect, a platform apparatus is provided, including: a slot, where one slot corresponds to one slot ID; a service blade, which is inserted into the slot; and a management unit, which is connected to the Ethernet and connected, over a platform management interface network, to more than one slot, where the management unit is configured to receive a first Internet Protocol IP address setting command in an Ethernet protocol format over the Ethernet; convert the first IP address setting command into a second IP address setting command in a platform management interface protocol format, where the first IP address setting command and the second IP address setting command include the slot ID of the slot into which the service blade is inserted and IP address data corresponding to the slot ID (identifier); and send the second IP address setting command to the service blade corresponding to the slot ID over the platform management interface network, so that the service blade sets an IP address for one or more network adapter modules on the service blade according to the IP address data included in the IP address setting command.

According to another aspect of the embodiments of the present invention, a platform management system is provided, including: a platform apparatus, which includes a slot, a service blade, and a management unit, where one slot corresponds to one slot ID, the service blade is inserted into the slot, and the management unit is connected to the Ethernet and connected, over a platform management interface network, to more than one slot, and the management unit is configured to receive a first IP address setting command in an Ethernet protocol format over the Ethernet, convert the first IP address setting command into a second IP address setting command in a platform management interface protocol format, where the first IP address setting command and the second IP address setting command include the slot ID of the slot into which the service blade is inserted and IP address data corresponding to the slot ID, and send the second IP address setting command to the service blade corresponding to the slot ID over the platform management interface network, so that the service blade sets an IP address for one or more network adapter modules on the service blade according to the IP address data included in the IP address setting command; and a network management apparatus, which is connected to the platform apparatus over the Ethernet, and is configured to generate the first IP address setting command or a first IP address query command, and send the first IP address setting command or the first IP address query command to the platform apparatus over the Ethernet.

In the embodiments of the present invention, an IP address setting command is sent to the service blade over the platform management interface network according to the slot ID of the slot into which the service blade is inserted, which implements a function of setting an IP address for the service blade, thereby avoiding a problem of an additionally increased cost because of an external device in use.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic block diagram of a platform management system according to an embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be noted that some specific embodiments of the present invention are described as follows by primarily using ATCA as an example; however, the embodiments of the present invention are not limited thereto. The embodiments of the present invention may be similarly applied to another architecture system of a private network that is independent of IP technologies, for example, an architecture system using a platform management interface network. These applications shall fall within the scope of the embodiments of the present invention.

Figure 1:
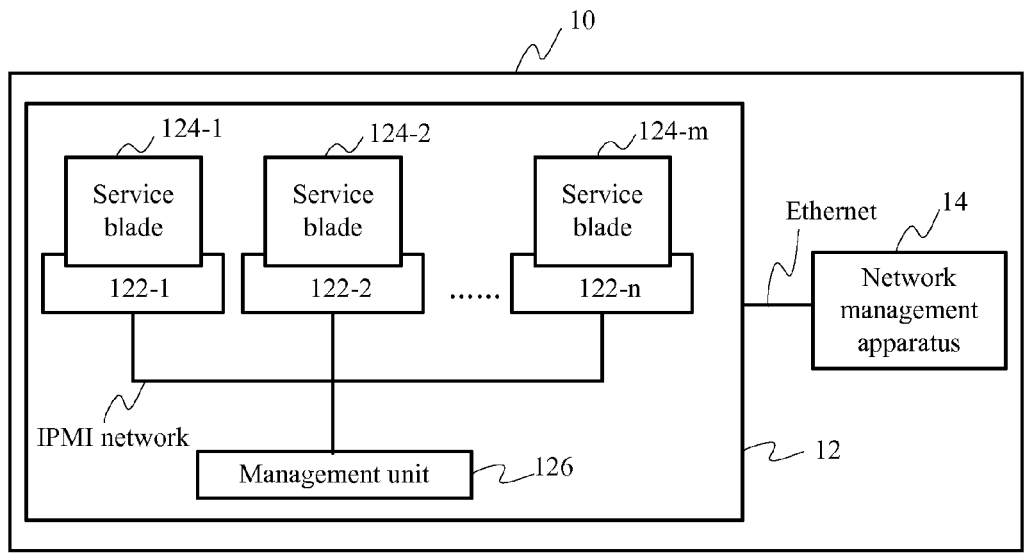

FIG. 1 is a schematic block diagram of a platform management system 10 according to an embodiment of the present invention. As shown in FIG. 1, the platform management system 10 includes a platform apparatus 12 and a network management apparatus 14. An example of the platform apparatus 12 is an ATCA shelf. The platform apparatus 12 and the network management apparatus 14 are connected over the Ethernet, so that the network management apparatus 14 may remotely manage the platform apparatus 12. The platform apparatus 12 includes multiple slots 122-1, 122-2, ... 122-n, where n is a natural number. In the following, the sign 122 is used to collectively refer to these slots.

One or more service blades 124-1, 124-2, ... 124-m are inserted into different slots 122, where 1≤m≤n. In the following, the sign 124 is used to collectively refer to these service blades.

The platform apparatus 12 further has a management unit 126. The management unit 126 is connected to the Ethernet. For example, the management unit 126 is connected to the network management apparatus 14, and receives, over the Ethernet, a first IP address setting command in an Ethernet protocol format sent by the network management apparatus 14. As shown in FIG. 1, the management unit 126 is further connected to multiple slots 122 over an IPMI (Intelligent Platform Management Interface, Intelligent platform management interface) network. An IPMI network is a network based on an IPMB (Intelligent Platform Management Bus, intelligent platform management bus) bus. The management unit 126 converts the first IP address setting command into a second IP address setting command in an IPMI protocol format, where the first IP address setting command and the second IP address setting command include a slot ID of a slot 122 into which a service blade 124 is inserted and IP address data corresponding to the slot ID, and sends the second IP address setting command to the service blade 124 corresponding to the slot ID over the IPMI network, thereby setting an IP address for the service blade 124.

In cases where the platform apparatus 12 is an ATCA shelf, the management unit 126 may be a shelf management blade SMM in the ATCA shelf.

Figure 2:
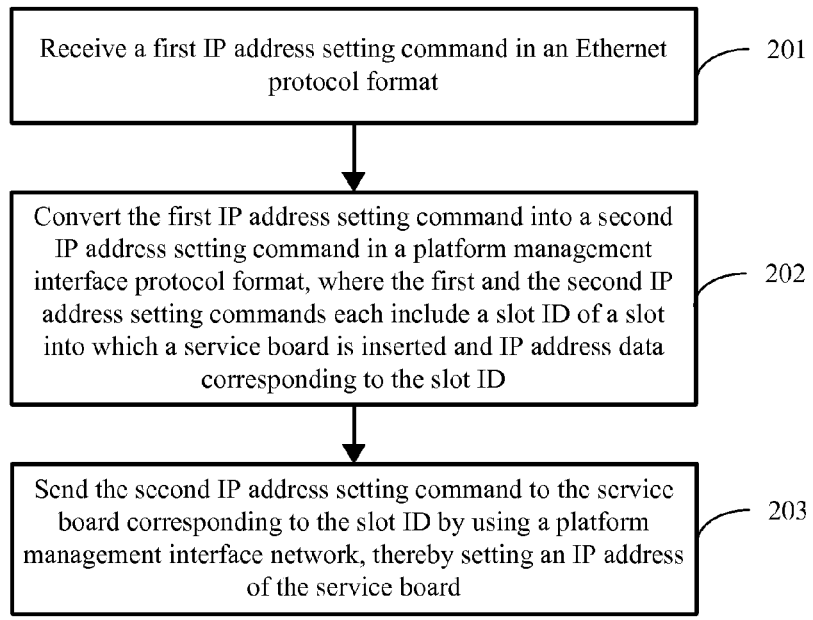
FIG. 2 is a schematic flowchart of a method for managing a service blade according to an embodiment of the present invention.

Operations performed by the management unit 126 are described as follows with reference to FIG. 2. FIG. 2 is a schematic flowchart of a method for managing a service blade according to an embodiment of the present invention. The management unit 126 (for example, an SMM) illustrated in FIG. 1 controls a service blade 124 according to the method illustrated in FIG. 2.

201. The management unit 126 receives a first IP address setting command in an Ethernet protocol format. For example, the management unit 126 may receive, over the Ethernet, a first IP address setting command generated by the network management apparatus 14. The first IP address setting command includes a slot ID of a slot 122 into which a service blade 124 that needs to be managed is inserted and IP address data corresponding to the slot ID.

202. The management unit 126 converts the first IP address setting command into a second IP address setting command in a platform management interface protocol (for example, an IPMI protocol) format. For example, the management unit 126 obtains the slot ID and the IP address data corresponding to the slot ID from the first IP address setting command, and encapsulates the obtained slot ID and the obtained IP address data corresponding to the slot ID into the second IP address setting command in an IPMI protocol format, thereby transmitting the second IP address setting command over an IPMI network (for example, over an IPMB bus). The second IP address setting command also includes the slot ID of the slot 122 into which the service blade 124 is inserted and the IP address data corresponding to the slot ID.

203. The management unit 126 sends the second IP address setting command to the service blade 124 corresponding to the slot ID over the IPMI network, thereby setting an IP address for the service blade 124.

In this way, in the embodiment of the present invention, the slot ID of the slot into which the service blade is inserted and IP address data corresponding to the slot ID are included in the IP address setting command, so that the IP address setting command may be sent to the service blade corresponding to the slot ID over a platform management interface network, thereby implementing a function of setting an IP address for the service blade. Therefore, the embodiment of the present invention avoids a problem of an additionally increased cost because of an external device in use.

In addition, with respect to the method for managing a service blade, no existing IP network is used in the embodiment of the present invention, which overcomes security and reliability problems caused by unreliability of an IP network.

Figure 3:
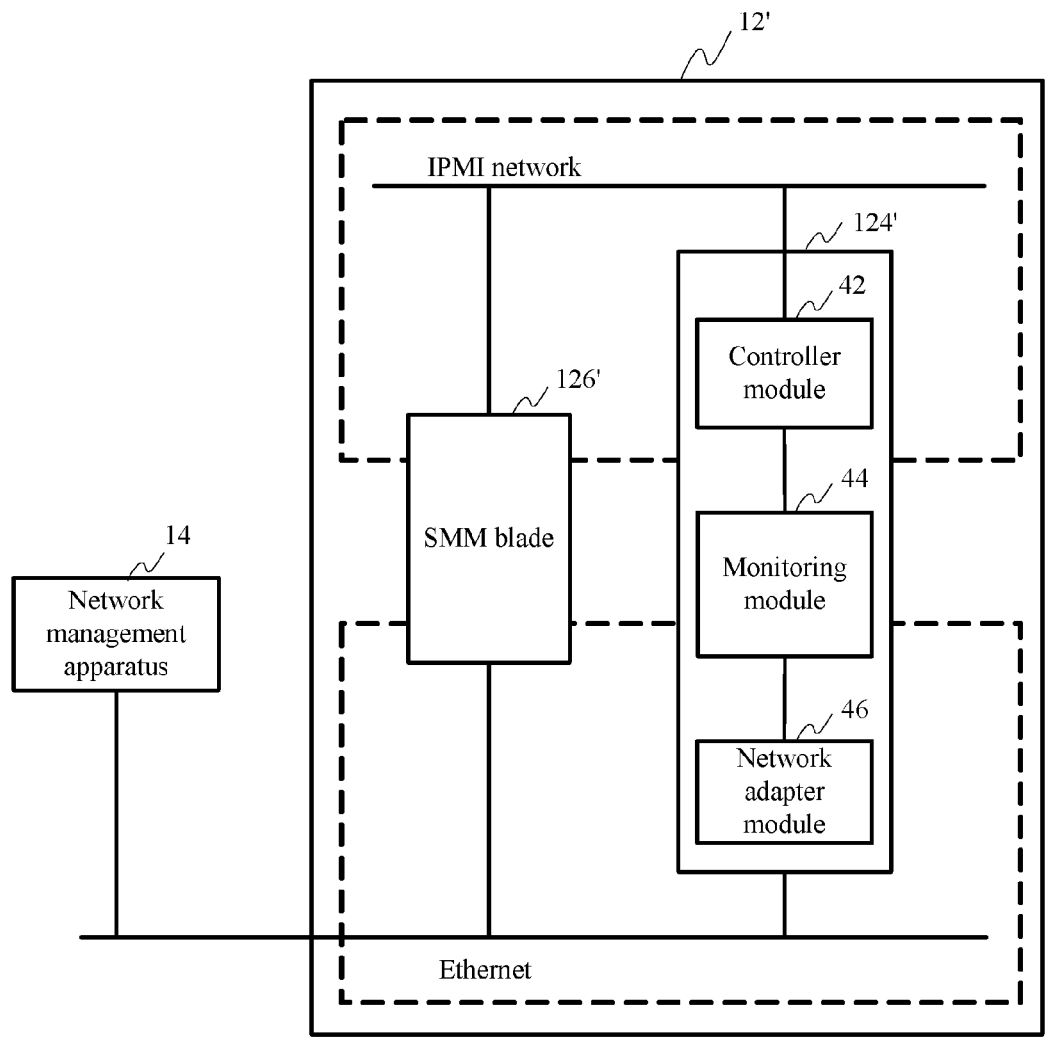
FIG. 3 is a schematic structural diagram of a platform management system according to another embodiment of the present invention.

FIG. 3 is a schematic structural diagram of a platform management system according to another embodiment of the present invention. In FIG. 3, the same drawing signs are used to represent a part that is the same as FIG. 1.

The platform management system in FIG. 3 includes a network management apparatus 14 and a platform apparatus 12'. The platform apparatus 12' is an example of the platform apparatus 12 in FIG. 1, and includes an SMM blade 126' and a service blade 124'. The SMM blade 126' is an example of the management unit 126 in FIG. 1, and the service blade 124' is an example of the service blade 124 in FIG. 1. For the sake of brevity, FIG. 3 shows only one SMM blade and one service blade; however, the embodiment of the present invention is not limited thereto. The number of SMM blades and service blades according to the embodiment of the present invention is not limited to the example in FIG. 3. For example, one ATCA shelf may include two SMM blades and 12 service blades.

The SMM blade 126' is connected to the network management apparatus 14 over the Ethernet, and is connected to each service blade over an IPMI network or connected to a slot of each service blade over the IPMI network. The service blade 124' includes a controller module 42, a monitoring module 44, and a network adapter module 46. It should be noted that FIG. 3 illustrates only one network adapter module 46; however, the embodiment of the present invention is not limited thereto, and the service blade 124' may include one or more network adapter modules 46.

The SMM 126' is configured to receive a first IP address setting command in an Ethernet protocol format over the Ethernet; convert the first IP address setting command into a second IP address setting command in a platform management interface protocol format, where the first IP address setting command and the second IP address setting command include a slot ID of a slot into which the service blade 124' is inserted and IP address data corresponding to the slot ID; and send the second IP address setting command to the service blade 124' corresponding to the slot ID over a platform management interface network, so that the service blade 124' sets an IP address for one or more network adapter modules on the service blade 124' according to the IP address data included in the IP address setting command.

According to an embodiment of the present invention, the controller module 42 may be implemented by using a hardware module BMC (Baseblade Management Controller, baseblade management controller) on a blade. The BMC communicates with the SMM blade 126' over an IPMB bus.

According to an embodiment of the present invention, the monitoring module 44 may be implemented by using a monitoring program module on a blade operating system OS. The monitoring module 44 monitors a command message on the controller module 42. For example, the monitoring module 44 may periodically monitor a storage area of the controller module 42, and perform a corresponding operation when finding that a corresponding IP address setting command or data is stored in the storage area.

Further, the network adapter module 46 may be a standard NIC (Network Interface Card, network interface card).

Figure 4:
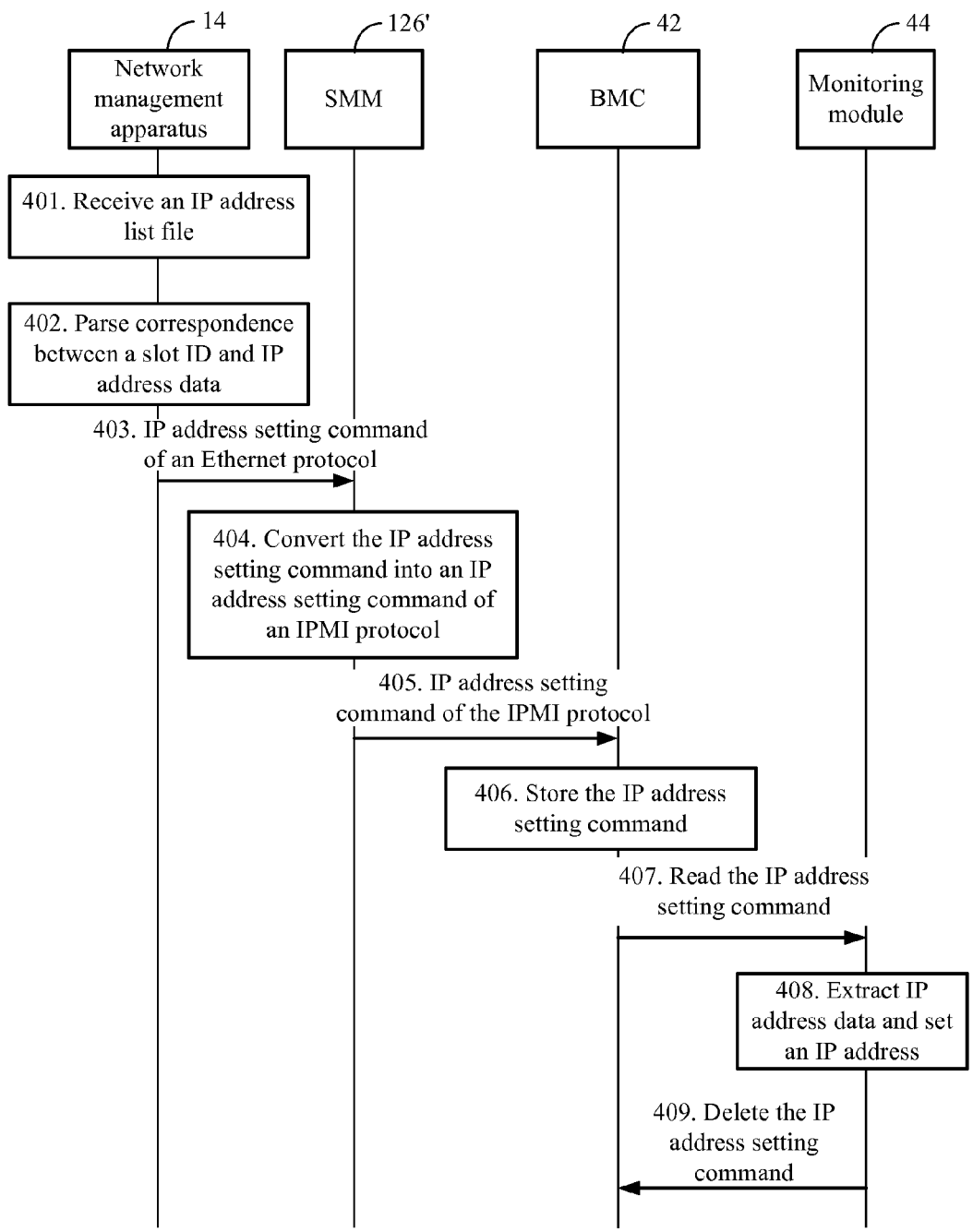
FIG. 4 is a schematic flowchart of a process of managing a service blade according to an embodiment of the present invention.

Operations performed by the platform management system in FIG. 3 are described in further detail as follows with reference to a specific example. FIG. 4 is a schematic flowchart of a process of managing a service blade according to an embodiment of the present invention. The process in FIG. 4 is described in detail with reference to each part in FIG. 3. In the embodiment illustrated in FIG. 4, a first IP address setting command and a second IP address setting command include a slot ID of a service blade 124' and IP address data corresponding to the slot ID.

401. The network management apparatus 14 receives an IP address list file uploaded by a user.

The user may upload IP addresses, which need to be configured for various service blades, to the network management apparatus 14 as a list file. The IP address list file includes correspondence between slot IDs of different service blades and IP address data that needs to be set for the service blades, where its format may be shown in the following Table 1.

TABLE 1

| | IP address list | | |
|---|---|---|---|
| Slot ID | Network Adapter | IP Address | Subnet Mask |
| 1 | Eth1 | 192.168.1.1 | 255.255.0.0 |
| | Eth2 | 192.168.1.2 | 255.255.0.0 |
| 2 | Eth1 | 192.168.2.1 | 255.255.0.0 |
| | Eth2 | 192.168.2.2 | 255.255.0.0 |
| 4 | ... | ... | ... |
| ... | | | |

Table 1 is merely an example of an IP address list, and is not intended to limit the scope of the embodiments of the present invention. As shown in Table 1, IP address data may include a network adapter identifier, an IP number, and a subnet mask. However, the embodiment of the present invention is not limited thereto. For example, the IP address data may include no subnet mask, where a default subnet mask is used when a service blade is set. Alternatively, in a case where only one network adapter module exists on a service blade, the IP address data may include no network adapter identifier. IP addresses and subnet masks that are different from those in table 1 may be used for various slot IDs and network adapter modules.

402. The network management apparatus 14 parses the IP address list file, and determines correspondence between a slot ID of a service blade and corresponding IP address data.

403. The network management apparatus 14 sends an IP address setting command in an Ethernet protocol format to the SMM blade 126' over the Ethernet, for setting an IP address for a first network adapter module of a first service blade in the list. The IP address setting command includes the slot ID of the service blade and the corresponding IP address data, for example, an IP address and a subnet mask. An example of the IP address setting command is shown as follows:

smmset −1 slot1 dev eth1 ipaddress 192.168.1.1 netmask 255.255.0.0 where a parameter following "−1" defines a slot ID ("slot1") of a slot into which a target service blade is inserted; a parameter following "dev" defines a network adapter (eth1) of the service blade that needs to be set on slot1; a parameter following "ipaddress" defines a specific IP address that needs to be set for the network adapter eth1 of the service blade on slot1; and a parameter following "netmask" defines a subnet mask corresponding to the IP address.

404. After the SMM blade 126' receives the IP address setting command in the Ethernet protocol format, converts the IP address setting command in the Ethernet protocol format into an IP address setting command in an IPMI protocol format. For example, various components of an ATCA shelf, such as an SMM blade, a fan blade, a power source blade, and a service blade, have their respective fixed IPMB addresses. A message of an IPMI protocol is responded to and distributed according to these fixed addresses. The distribution of and responding to a pure IPMI message itself may depend upon an IPMB address. With respect to a service blade, an IPMB address is in one-to-one correspondence to a physical slot ID thereof. When an IP address setting command in an IPMI protocol format is generated, an IPMB address of a service blade may be carried in the command, to serve as information about a slot ID of a slot into which the service blade is inserted. When the IP address setting command including the IPMB address is sent over an IPMI network (in other words, an IPMB bus), the IP address setting command is capable of locating the service blade corresponding to the IPMB address, that is, the service blade corresponding to the slot ID. In addition, the IP address setting command in the IPMI protocol format further carries corresponding IP address data.

405. The SMM blade 126' sends the IP address setting command based on the IPMI protocol format to a BMC 42 of the service blade (in this case, the service blade is the first service blade mentioned above) corresponding to the slot ID over the IPMI network, so that the service blade sets an IP address for one or more network adapter modules on the service blade according to the IP address data included in the IP address setting command.

406. After the BMC 42 of the first service blade receives the IP address setting command sent by the SMM blade 126', stores the IP address setting command in a storage area of the BMC 42.

407. The monitoring module 44 monitors the storage area of the BMC 42, and when monitoring that an IP address setting command is stored in the storage area, reads the IP address setting command.

408. The monitoring module 44 extracts the IP address data in the IP address setting command, and sets an IP address for a network adapter module 46 (in this case, the network adapter module 46 is the network adapter eth1 mentioned above) corresponding to the IP address data on an operating system of the service blade according to the extracted IP address data.

409. After the monitoring module 44 sets an IP address for the network adapter eth1, deletes the corresponding IP address setting command from the storage area of the BMC 42.

In the above embodiment, the monitoring module 44 extracts the IP address data from the IP address setting command. In the embodiment of the present invention, the IP address data may also be extracted from the IP address setting command by the BMC 42. In this case, in 406, the BMC 42 stores the extracted IP address data in the storage area, and then in 407, when the monitoring module 44 monitors that the IP address data is stored in the storage area, reads the IP address data. In 408, the monitoring module 44 sets an IP address for the network adapter module 46 (in this case, the network adapter module 46 is the network adapter eth1 mentioned above) corresponding to the IP address data on the operating system of the service blade according to the read IP address data.

The process from 403 to 409 is repeated to set an IP address for another network adapter module on the first service blade and an IP address of a network adapter module on a 2nd, 3rd, . . . mth service blade, until IP addresses of all blades are set completely.

In this way, in the embodiments of the present invention, an IP address setting command is sent to the service blade over the platform management interface network according to the slot ID of the slot into which the service blade is inserted, which implements a function of setting an IP address for the service blade, thereby avoiding a problem of an additionally increased cost because of an external device in use.

Figure 5:
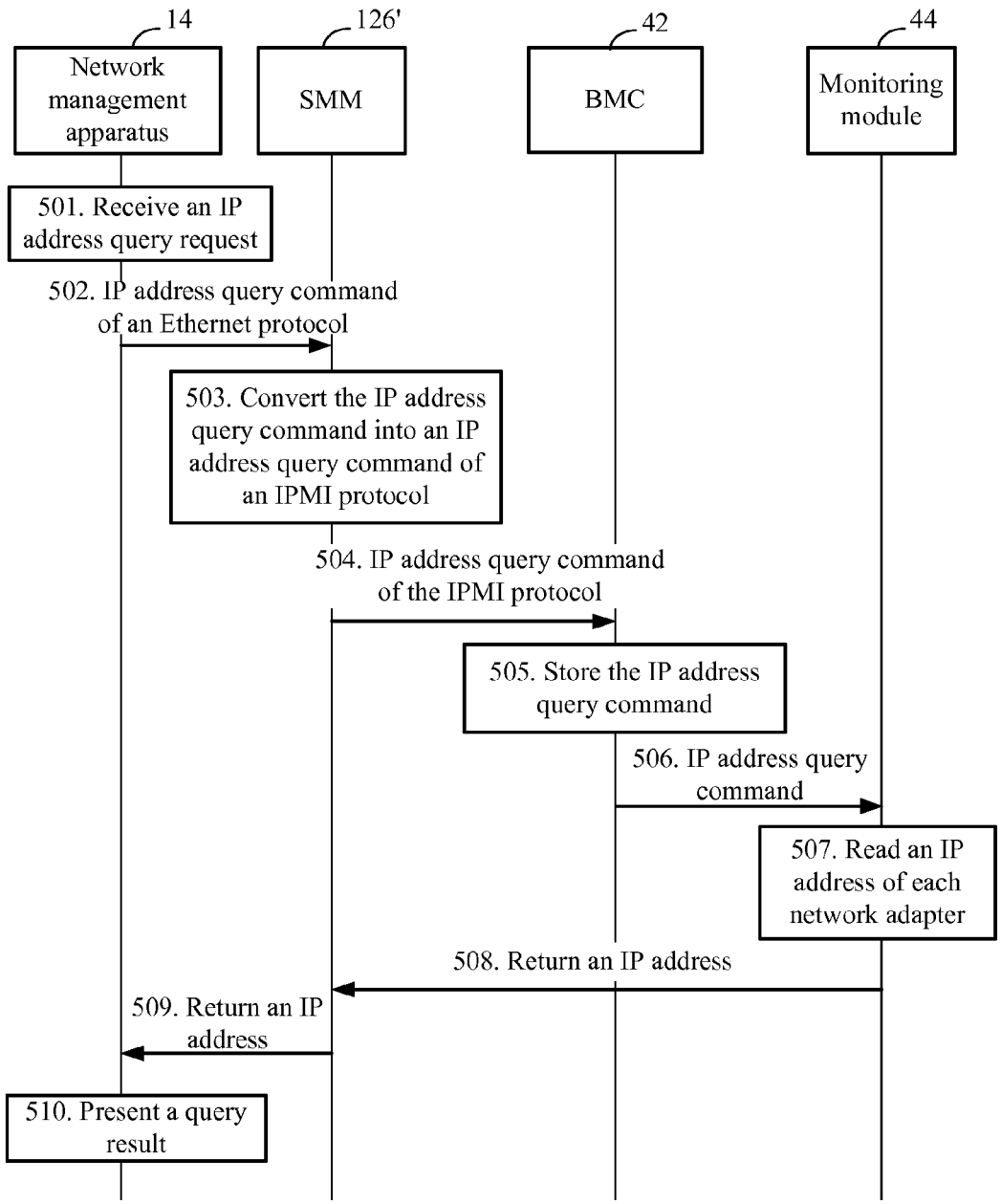
FIG. 5 is a schematic flowchart of a process of managing a service blade according to another embodiment of the present invention.

Similarly, in an embodiment of the present invention, an IP address on each service blade may also be queried. FIG. 5 is a schematic flowchart of a process of managing a service blade according to another embodiment of the present invention. The process in FIG. 5 is described in detail with reference to parts in FIG. 3. In the embodiment illustrated in FIG. 5, an IP address query command is used to query an IP address that is set on a service blade. The IP address query command includes a slot ID of a slot into which a service blade is inserted.

501. The network management apparatus 14 receives a request of a user for querying an IP address of a service blade slotk (where slotk is a slot ID of a slot into which the service blade is inserted).

502. The network management apparatus 14 generates an IP address query command (in an Ethernet protocol format) for querying the IP address on the service blade slotk, and sends the command for querying the blade IP address of the service blade slotk to the SMM blade 126'. An example of the IP address query command is shown as follows:

smminq −1 slotk where a parameter following "−1" defines a slot ID ("slotk") of a slot into which a service blade to be queried is inserted.

503. The SMM blade 126' converts the command from the network management apparatus 14 into an IP address query command in an IPMI protocol format. Reference may be made to the description of 404 in FIG. 4 for a conversion method. For example, the IP address query command in the IPMI protocol format includes an IPMB address corresponding to the slot ID slotk.

504. The SMM blade 126' sends the IP address query command in the IPMI protocol format to a BMC 42 of the service blade slotk corresponding to the slot ID slotk over an IPMI network, so that the service blade obtains an IP address of one or more network adapter modules on the service blade according to the IP address query command.

505. After the BMC 42 receives the IP address query command, stores the IP address query command in a storage area.

506. After the monitoring module 44 on an OS of the service blade slotk monitors that the IP address query command is stored in the storage area of the BMC 42, reads the IP address query command of the IPMI protocol.

507. The monitoring module 44 parses the IP address query command of the IPMI protocol, and queries an IP address of each network adapter module recorded in the operating system of the service blade slotk.

508. The monitoring module 44 returns the queried IP address to the SMM blade 126' by using the BMC 42.

509. The SMM blade 126' feeds back the queried IP address to the network management apparatus 14.

510. The network management apparatus 14 presents the queried IP address to the user.

In the above embodiment, the IP addresses of various network adapter modules on one service blade are queried at one time. The embodiment of the present invention also allows querying an IP address of a specific network adapter module on a service blade, where in this case, an IP address query command includes a network adapter identifier of the specific network adapter module to be queried.

In this way, in the embodiment of the present invention, the slot ID of the slot into which the service blade is inserted is included in the IP address query command, so that the IP address query command may be sent to the service blade corresponding to the slot ID over a platform management interface network, thereby implementing a function of querying an IP address of the service blade.

In the embodiments of the present invention, no extra device (such as displaying and input devices) is required for setting and querying an IP address for a service blade by network management, which improves maintainability. It is unnecessary to plan and configure an initialized IP in advance for a service blade in a manufacturing phase, which reduces a production pre-installation cost.

In the embodiments of the present invention, IP addresses may be set in batches remotely and automatically, which improves maintenance efficiency. Further, when an existing IP address of a service blade becomes invalid (the same IP address exists in a local area network or a network segment where the IP address is located is changed), an IP address may be set again for a service blade without using the Ethernet, which improves the means for clearing a fault.

In addition, in the embodiments of the present invention, IP addresses of all network adapters of a service blade may be queried without logging in to the service blade over the Ethernet.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for the detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in each embodiment of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

The foregoing description is merely about specific embodiments of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for setting an Internet Protocol IP address for a service blade, the service blade comprising computer hardware configured, including configured by a program, to implement at least one module, the method comprising:
   receiving a first IP address setting command, which comprises a slot identifier (ID) of a slot into which the service blade is inserted and IP address data corresponding to the slot ID, in an Ethernet protocol format;
   converting the first IP address setting command into a second IP address setting command in a platform management interface protocol format for a platform management interface network, wherein the second IP address setting command comprises the slot ID of the slot into which the service blade is inserted and the IP address data corresponding to the slot ID; and
   sending the second IP address setting command, which comprises the slot ID and the IP address data corresponding to the slot ID, to the service blade corresponding to the slot ID over the platform management interface network,
   thereby enabling the service blade corresponding to the slot ID to set an IP address of the IP address data for one or more network adapter modules on the service blade according to the IP address data comprised in the second IP address setting command.

2. The method according to claim 1, wherein the enabling the service blade corresponding to the slot ID to set the IP address comprises:
   storing, by the service blade, the IP address setting command in a storage area of a controller module of the service blade; and
   extracting, by a monitoring module of the service blade, the IP address data from the IP address setting command when monitoring that the IP address setting command is stored in the storage area, and setting the IP address for the one or more network adapter modules on an operating system of the service blade according to the extracted IP address data.

3. The method according to claim 1, wherein the enabling the service blade corresponding to the slot ID to set the IP address comprises:
   extracting, by a controller module of the service blade, the IP address data from the IP address setting command, and storing the IP address data in a storage area of the controller module; and
   setting, by a monitoring module of the service blade, the IP address for the one or more network adapter modules on an operating system of the service blade according to the IP address data when monitoring that the IP address data is stored in the storage area.

4. The method according to claim 1, further comprising:
receiving a first IP address query command in the Ethernet protocol format;
converting the first IP address query command into a second IP address query command in the platform management interface protocol format, wherein the first IP address query command and the second IP address query command comprise a slot ID of a slot into which a service blade is inserted;
sending the second IP address query command to the service blade corresponding to the slot ID over the platform management interface network, thereby enabling the service blade to obtain an IP address of one or more network adapter modules on the service blade according to the IP address query command; and
receiving the IP address of the one or more network adapter modules obtained by the service blade.

5. The method according to claim 4, wherein the enabling the service blade to obtain the IP address of the one or more network adapter modules comprises:
storing, by the service blade, the IP address query command in a storage area of a controller module; and
when a monitoring module of the service blade monitors that the IP address query command is stored in the storage area, querying the IP address of the one or more network adapter modules recorded by an operating system of the service blade, and transmitting the queried IP address of the one or more network adapter modules to the controller module.

6. A platform apparatus, comprising:
a slot, wherein one slot corresponds to one slot ID;
a service blade, which is inserted into the slot; and
a management unit, which is connected to the Ethernet and connected, over a platform management interface network, to more than one slot, wherein the management unit comprises computer hardware configured, including configured by a program, to:
receive a first Internet Protocol IP address setting command, which comprises a slot identifier (ID) of a slot into which the service blade is inserted and IP address data corresponding to the slot ID, in an Ethernet protocol format over the Ethernet;
convert the first IP address setting command into a second IP address setting command in a platform management interface protocol format for a platform management interface network, wherein the second IP address setting command comprises the slot ID of the slot into which the service blade is inserted and IP address data corresponding to the slot ID; and
send the second IP address setting command, which comprises the slot ID and the IP address data corresponding to the slot ID, to the service blade corresponding to the slot ID over the platform management interface network, so that the service blade corresponding to the slot ID sets an IP address of the IP address data for one or more network adapter modules on the service blade according to the IP address data comprised in the second IP address setting command.

7. The platform apparatus according to claim 6, wherein the service blade comprises computer hardware configured, including configured by a program, to implement:
a controller module, configured to store the IP address setting command in a storage area of the controller module; and
a monitoring module, configured to, when monitoring that the IP address setting command is stored in the storage area, extract the IP address data from the IP address setting command, and set the IP address of the IP address data for the one or more network adapter module on an operating system of the service blade according to the extracted IP address data.

8. The platform apparatus according to claim 6, wherein the service blade comprises computer hardware configured, including configured by a program, to implement:
a controller module, configured to extract the IP address data from the IP address setting command, and store the IP address data in a storage area of the controller module; and
a monitoring module, configured to, when monitoring that the IP address data is stored in the storage area, set the IP address of the IP address data for the one or more network adapter modules on an operating system of the service blade according to the IP address data.

9. The platform apparatus according to claim 6, wherein the computer hardware of the management unit is further configured to:
receive a first IP address query command in the Ethernet protocol format;
convert the first IP address query command into a second IP address query command in the platform management interface protocol format, wherein the first IP address query command and the second IP address query command comprise a slot ID of a slot into which a service blade is inserted;
send the second IP address query command to the service blade corresponding to the slot ID over the platform management interface network, so that the service blade obtains an IP address of one or more network adapter modules on the service blade according to the IP address query command; and
receive the IP address of the one or more network adapter modules obtained by the service blade.

10. The platform apparatus according to claim 9, wherein the service blade comprises computer hardware configured, including configured by a program, to implement:
a controller module, configured to store the IP address query command in a storage area of the controller module; and
a monitoring module, configured to, when monitoring that the IP address query command is stored in the storage area, query the IP address of the one or more network adapter modules recorded by an operating system of the service blade, and transmit the queried IP address of the one or more network adapter modules to the controller module.

11. A platform management system, comprising:
a platform apparatus comprising a slot, a service blade, and a management unit,
wherein one slot corresponds to one slot ID;
the service blade is inserted into the slot; and
the management unit is connected to the Ethernet and connected, over a platform management interface network, to more than one slot, and the management unit comprises computer hardware configured, including configured by a program, to:
receive a first Internet Protocol IP address setting command, which comprises a slot identifier (ID) of a slot into which the service blade is inserted and IP address data corresponding to the slot ID, in an Ethernet protocol format over the Ethernet;

convert the first IP address setting command into a second IP address setting command in a platform management interface protocol format for a platform management interface network, wherein the second IP address setting command comprises a slot ID of a slot into which a service blade is inserted and IP address data corresponding to the slot ID; and send the second IP address setting command, which comprises the slot ID and the IP address data corresponding to the slot ID, to the service blade corresponding to the slot ID over the platform management interface network, so that the service blade corresponding to the slot ID sets an IP address of the IP address data for one or more network adapter modules on the service blade according to the IP address data comprised in the second IP address setting command; and a network management apparatus, connected to the platform apparatus over the Ethernet, and configured to generate the first Internet Protocol IP address setting command or a first IP address query command, and send the first IP address setting command or the first IP address query command to the platform apparatus over the Ethernet.

* * * * *